United States Patent [19]

McCurrich et al.

[11] 4,131,480
[45] Dec. 26, 1978

[54] PUMPABLE CEMENTITIOUS COMPOSITIONS

[75] Inventors: Lawrence H. McCurrich, Chesham; Steven A. Lammiman, Hemel Hempstead, both of England

[73] Assignee: Fosroc Holdings (U.K.) Limited, England

[21] Appl. No.: 778,276

[22] Filed: Mar. 16, 1977

[51] Int. Cl.² ................................................ C04B 7/02
[52] U.S. Cl. .......................................... 106/93; 106/97
[58] Field of Search ...................................... 106/93, 97

[56] References Cited

U.S. PATENT DOCUMENTS

| | | | |
|---|---|---|---|
| 3,762,937 | 10/1973 | Schupack | 106/93 |
| 3,788,869 | 1/1974 | Batdorf et al. | 106/93 |

*Primary Examiner*—James Poer
*Attorney, Agent, or Firm*—Caesar, Rivise, Bernstein & Cohen, Ltd.

[57] ABSTRACT

The invention concerns a pumpable cementitious composition containing porous light weight aggregate. The composition is rendered pumpable by the addition of a dispersing agent and a gelling agent in sufficient amount to reduce the absorption of water by the aggregate when the composition is pumped. In particular, the dispersing agent is a sulphonated melamine or naphthalene formaldehyde or a sulphonated polystyrene, and the gelling agent is a water soluble cellulose derivative such as methyl cellulose, the two agents each comprising 0.001% to 0.04% by weight of the composition.

16 Claims, No Drawings

PUMPABLE CEMENTITIOUS COMPOSITIONS

This invention relates to cementitious compositions containing porous light weight aggregates.

Light weight aggregates tend to be porous and cannot therefore usually be included in cementitious compositions to be pumped because when pressure is applied to compositions containing such aggregates the water in the mix is forced into the pores of the aggregate particles, resulting in a considerable loss of workability of the composition. The loss of workability may result in blockages in the pump, where pressures of the order of 1000 to 4000 $kN/m^2$ may occur.

The absorption of water by the aggregate when the composition is being pumped may be reduced by presoaking the aggregate. This requires the use of an expensive vacuum soaking method, which results in a considerable increase in the overall cost of the pumping operation and thus makes it uneconomic in comparison with conventional conveyor placing techniques, which are slower. For these reasons, pumping of light weight aggregate concrete has not previously been practised widely.

Accordingly, the invention provides a pumpable cementitious composition comprising a hydraulic cement, water, a porous light weight aggregate, and sufficient of both a dispersing agent and a gelling agent to reduce the absorption of water by the aggregate when the composition is pumped.

While the proportions of the dispersing agent and gelling agent can vary widely depending upon the light weight aggregate used and the head against which the concrete mix is required to be pumped, the agents preferably each comprise 0.001% to 0.04% by weight of the composition, amounts in the range 0.008% to 0.015% being especially effective.

In this context a dispersing agent is one which will disperse cement particles and will not retard the setting of the cement irrespective of the concentration in which it is used. Examples of such dispersing agents include sulphonated melamine formaldehyde, sulphonated polystyrenes, sulphonated naphthalene formaldehyde.

The gelling agent is typically a water soluble cellulose derivative, for example methyl cellulose, hydroxy ethyl methyl cellulose, hydroxypropyl methyl cellulose and hydroxyethyl cellulose.

It is also much preferred to include in the composition a plasticizer for the concrete. This typically is a dispersing agent of the type which, if used in high concentration, will tend to retard the setting of the cement. Examples include lignosulphonate, hydroxycarboxylic acid derivatives such as sodium gluconate or sodium heptanoate. A weight ratio of plasticizer to gelling agent to dispersing agent of about 3:1:1 is particularly suitable.

The hydraulic cement may be an ordinary Portland cement, or a sulphate-resisting or rapid-hardening cement. Any commercially-available porous light weight aggregate may be used. Thus, the aggregate may comprise sintered pulverized fuel ash, for example the aggregate available under the trade name LYTAG. Other suitable porous light weight aggregates are clinker, foamed slag, expanded clays shale or slate, pumice, diatomite, expanded perlite and expanded vermiculite.

The aggregate may be wholly light weight fines, in which the particles have a maximum dimension less than 5 mm, or it may consist partly or wholly of larger particles. Sand may be included in the composition.

The invention also provides a method of pumping a cementitious composition containing a porous light weight aggregate, which comprises adding to the composition, before pumping, sufficient of both a dispersing agent and a gelling agent to reduce the absorption of water by the aggregate under pressure. Preferably the dispersing agent and the gelling agent are added in the form of an admixture, which may be in powder form.

The invention is further illustrated by the following Examples in which all percentages are by weight.

EXAMPLE 1

A concrete mix to be cast into a body of about 1 $m^3$ in volume was made of the following:
450 kg: ordinary Portland cement
740 kg: sand (including 6% water)
570 kg: "LYTAG" light weight aggregate (including about 12% water)
204 g: sulphonated melamine formaldehyde condensate
204 g: hydroxyethyl cellulose
592 g: lignosulphonate
310 kg: water
("LYTAG" is a trade name of Lytag Limited)

The components were mixed together to form a wet concrete mix, which was then pumped at a pressure of about 2000 $kN/m^2$ into a mould to form a body of about 1 $m^3$ in volume. The concrete on subsequent testing was found to have adequate compressive strength. No difficulties were experienced in pumping the composition.

EXAMPLE 2

A concrete mix was prepared from the following, the weights given being those for each cubic meter of the mix prepare:
400 kg: ordinary Portland cement
700 kg: Sand (6% water)
500 kg: "LYTAG" light weight aggregate (3.5% water)
204 g: sulphonated melamine formaldehyde condensate
204 g: hydroxyethyl cellulose
592 g: lignosulphonate
260 kg: water.

Some of the water was first poured into a mixing truck and the aggregate, sand and cement were then added, the other components being poured in powder form on to the aggregate, sand and cement as they were introduced into the truck. The remainder of the water was then added and the components thoroughly mixed.

This mix was pumped through a 100 mm internal diameter pipe to a height of 12 to 13 m and over a distance of about 35 m at a rate of 0.7–0.8 $m^3$ per minute. Pumping was continued for a period of 5 hours, during which time approximately 80 to 85 $m^3$ of concrete were pumped, giving an average pumping rate, including waiting time, mixing time and other normal delays, of about 0.27 to 0.28 $m^3$/minute. This rate is comparable with that obtained with concrete containing ordinary aggregates. The concrete, after pumping, was of high workability and was easily placed and vibrated. Samples of the concrete achieved adequate compressive strength after 28 days' curing.

EXAMPLE 3

A concrete mix was prepared from the following, the weight being those for each cubic meter of the mix prepared:
375 kg: ordinary Portland cement 770 kg: sand
520 kg: "LYTAG" lightweight aggregate (pumping grade)
218 kg: water (excluding water absorbed by the aggregate on mixing)
204 g: sulphonated melamine formaldehyde condensate
204 g: hydroxyethyl cellulose
592 g: lignosulphonate The mix was pumped through a 100 mm internal diameter pipe through a distance of 31 m without difficulty.

COMPARATIVE EXAMPLE

A concrete mix was prepared as in Example 1, but excluding the melamine sulphonate/formaldehyde condensate, the cellulose ether and the lignosulphonate. An attempt was made to pump the mix at a pressure of about 2000 kN/m$^2$ but blockages occurred in the pump due to loss of workability of the mix, and continuous pumping of the material was not possible.

What we claim is:

1. In a cement composition comprising a hydraulic cement, water and a porous light weight aggregate, the improvement comprising adding to said composition 0.001% to 0.04% by weight of said composition of a dispersing agent, 0.001% to 0.04% of a gelling agent and an effective amount of a plasticizer with said improvement reducing the absorption of water by said aggregate such that said composition with said improvement can be readily pumped under high pressure.

2. A composition according to claim 1, which also comprises a plasticizer.

3. A composition according to claim 2, in which the plasticizer is present in amount greater than that of the dispersing agent and gelling agent together.

4. A composition according to claim 3, in which the plasticizer, the dispersing agent and the gelling agent are present in a weight ratio of 3:1:1.

5. A composition according to claim 1, in which the dispersing agent and the gelling agent each comprise 0.008% to 0.015% by weight of the composition.

6. A composition according to claim 1, in which the light weight aggregate comprises sintered pulverized fuel ash.

7. A composition according to claim 1, which also comprises sand.

8. In a method of improving pumpability of a cementitious composition through a pipe, said composition comprising a hydraulic cement, water and a porous light weight aggregate, adding to said composition the following by weight percent of the composition: 0.001% to 0.04% of a dispersing agent, 0.001% to 0.04% of a gelling agent, and an effective amount of a plasticizer to reduce the absorption of water by the aggregate when said composition is pumped in said pipe under pressure.

9. A method according to claim 8, in which the dispersing agent and the gelling agent are added in the form of an admixture.

10. A method according to claim 9, in which the admixture is added in powder form.

11. A method according to claim 8, in which the admixture includes a plasticizer.

12. A method according to claim 11, in which the plasticizer is present in amount greater than the of the dispersing agent and gelling agent together.

13. A method according to claim 12, in which the plasticizer, the dispersing agent and the gelling agent are present in a weight ration of 3:1:1.

14. A method according to claim 13, in which the dispersing agent and the gelling agent each comprise 0.008% to 0.015% by weight of the composition.

15. A method according to claim 11, in which the light weight aggregate comprises sintered pulverized fuel ash.

16. A method according to claim 11, which also comprises sand.